(12) United States Patent
Shlomo

(10) Patent No.: US 10,880,729 B2
(45) Date of Patent: Dec. 29, 2020

(54) METHOD AND SYSTEM FOR IDENTIFYING A USER OVER AN INTERNET PROTOCOL CONNECTION

(71) Applicant: Flash Networks, LTD, Herzliya (IL)

(72) Inventor: Dror Shlomo, Kiryat Tivon (IL)

(73) Assignee: Flash Networks, LTD, Herzliya (IL)

(*) Notice: Subject to any disclaimer, the term of this patent is extended or adjusted under 35 U.S.C. 154(b) by 56 days.

(21) Appl. No.: 16/174,230

(22) Filed: Oct. 29, 2018

(65) Prior Publication Data
US 2019/0191299 A1 Jun. 20, 2019

Related U.S. Application Data

(60) Provisional application No. 62/599,095, filed on Dec. 15, 2017.

(51) Int. Cl.
| | |
|---|---|
| *H04W 8/26* | (2009.01) |
| *H04L 29/08* | (2006.01) |
| *H04L 29/12* | (2006.01) |
| *H04W 8/20* | (2009.01) |

(52) U.S. Cl.
CPC ........... *H04W 8/26* (2013.01); *H04L 61/2007* (2013.01); *H04L 61/256* (2013.01); *H04L 67/02* (2013.01); *H04W 8/20* (2013.01); *H04L 61/2514* (2013.01); *H04L 61/605* (2013.01); *H04L 61/6054* (2013.01)

(58) Field of Classification Search
CPC .............. H04L 61/2007; H04L 61/256; H04L 61/6054; H04L 67/02; H04W 8/20; H04W 8/26
See application file for complete search history.

(56) References Cited

U.S. PATENT DOCUMENTS

| | | | | |
|---|---|---|---|---|
| 2009/0282468 A1* | 11/2009 | Banga | ...................... | H04L 67/02 726/8 |
| 2010/0162359 A1* | 6/2010 | Casey | ..................... | H04L 67/22 726/3 |
| 2013/0176850 A1* | 7/2013 | Mishra | .................... | H04L 12/46 370/235 |
| 2014/0143414 A1* | 5/2014 | Deng | .................. | H04L 61/6054 709/224 |
| 2015/0365845 A1* | 12/2015 | Lonka | ..................... | H04L 45/38 370/236 |

* cited by examiner

*Primary Examiner* — Mohamed A. Wasel
(74) *Attorney, Agent, or Firm* — Smith Tempel Blaha LLC; Gregory Scott Smith

(57) ABSTRACT

A technique to deliver Personally Identifiable Information (PIT) of a first subscriber from the plurality of subscribers that reside in a private network toward a first server from the plurality of IP servers that reside in a public network wherein the first server is involved in at least one transaction with the first subscriber is disclosed. In addition a Network-Address Translator (NAT) is used in order to allocate to the first subscriber a public IP address. Further, the communication between the first subscriber and the first IP server is encrypted. An example embodiment of the disclosed technique may impersonate the first subscriber and send the PII over an impersonated packet.

21 Claims, 3 Drawing Sheets

METHOD AND SYSTEM FOR IDENTIFYING A USER OVER AN INTERNET PROTOCOL CONNECTION

CROSS-REFERENCE TO RELATED APPLICATIONS

This utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the United States provisional application for patent that was filed on Dec. 15, 2017 and assigned the Ser. No. 62/599,095, which application is herein incorporated by reference in its entirety.

FIELD OF THE DISCLOSURE

The present disclosure relates to the field of data communication over a packet switch network such as but not limited to an Internet Protocol (IP) network. More particularly the disclosure relates to communicating IP packets over a cellular network such as but not limited to General Packet Radio Service (GPRS), Universal Mobile Telecommunications System (UMTS) or Long-Term Evaluation (LTE) network.

Furthermore the disclosure relates to communicating IP packets wherein encryption is used in the communication between the application running at a user device and the application running at an IP server. It should be noted that the terms "IP server", "domain", "content server", "content provider" and "web server", etc. can be used interchangeably herein.

DESCRIPTION OF BACKGROUND ART

There are communication sessions over an IP network between a mobile devices and an IP severs, in which the IP server needs to identify the client, the mobile device. It should be noted that the terms "client", "mobile device", "subscriber" and "user" can be used interchangeably herein. In some cases the user can change devices or a device can change users, or the device can act independently of a user, such as but not limited to Internet-Of-Things (IOT).

The identification can be used for payment, for authentication, for analyzing the preference of the client, etc. Examples of such IP servers, which need to identify the user, can be servers that reside at a domain of a content provider that sells content such as movies; or servers that resides at advertisers (AD) networks, etc.

Adding Personally Identifiable Information (PII) of a subscriber or the relevant mobile device can be implemented by an access gateway (AGW) that locates at an Access-Network-Operator Premises (ANOP). An example for AGW can be a P-GW that locates at the ANOP of an LTE cellular operator.

PII can be added to the HTTP header (HTTP header enrichment) as a custom header. Along the disclosure and the claims this custom header may be referred as PII header. HTTP stands for Hypertext Transfer Protocol. The PII Header can be used by the application, running at the IP server, to perform various actions on the subscriber. Actions such as but not limited to seamless authentication to portals; micro payments with mobile phone; access to carrier Customer relationship management (CRM) via MSISDN, etc.

The PII can be added to the HTTP header by a proxy, a deep-packet-inspection server (DPI), etc. that is located at the ANOP. In some cases the PII can be added to two or more HTTP headers. Other protocols, such as but not limited to SMTP may also use extension in order to add PII. SMTP stands for Simple Mail Transfer Protocol. For the purposes of simplicity and readability, the present disclosure relates in more details to HTTPS as an example of an encrypted transfer protocol, however a person having an ordinary skill in the art can adapt the disclosed technique to other type of encrypted transfer protocols.

The PII may comprise the MSISDN; the IMSI or the IMEI of the mobile device; etc. MSISDN stand for Mobile Station International Subscriber Directory Number, usually the MSISDN is the dialing number of the cellular device. IMSI stands for International Mobile Subscriber Identity. The IMEI stands for International Mobile Station Equipment Identity. The MSISDN, the IMSI or the IMEI can be stored in the SIM card of the mobile device. SIM stands for subscriber identity module. A person with ordinary skill in the art is familiar with the functionality of MSISDN, IMSI, IMEI and SIM; therefore it will not be further disclosed. In some cases the PII may comprise additional information, information such as but not limited to gender, size, preferences, etc.

A client of a private network such as but not limited to a Local Area network (LAN) of an organization or a client of an Internet Service Provider (ISP), etc. may use its assigned IP address, the private IP address, as the client PII. In some cases the MAC address of the device can be used as PII. MAC address stands for media access control address.

However, today many of the connections are encrypted and can be carried over HTTPS/TLS, for example. TLS stands for Transport Layer Security and HTTPS stands for HTTP over TLS. Thus, in order to add any information regarding the subscriber, an intermediate node may need to decrypt the traffic, add the required information and then to encrypt the traffic. However, such a process requires computing power and time, thus increases the delay between transmitting the packets and obtaining the packet at its destination. Furthermore, opening the encryption requires the approval of the user and or the destination IP server. An example of an intermediate node can reside in the ANOP.

In addition, the source IP address that is used by the subscriber can be an assigned IP address that is used only in the carrier network. Therefore, when a subscriber of a mobile device requests to establish a connection with an IP server, which reside in an external domain, then an Internet gateway (I-GW) is needed. In some cases the I-GW may act as a Carrier-grade NAT (CGN) or may communicate with a CGN in order to allocate a public IP address to that mobile device for that session. NAT stands for Network Address Translator.

BRIEF SUMMARY

The needs and the deficiencies that are described above for identifying the PII of a subscriber are not intended to limit the scope of the inventive concepts of the present disclosure in any manner. The needs are presented for illustration only.

An example of the disclosed technique may employ a network element (NE) that is communicatively coupled between a plurality of subscribers and a plurality of IP servers, wherein the plurality of subscribers reside in a service provider network and the plurality of IP servers reside outside of the service provider network. An example of an NE can be configured to inspect transactions that are executed between the plurality of subscribers and the plurality of IP servers. In addition the NE can be configured to deliver Personally Identifiable Information (PII) of a first subscriber from the plurality of subscribers toward a first server from the plurality of IP servers wherein the first server is authorized to get the PII and is involved in at least one transaction with the first subscriber and wherein the communication between the first subscriber and the first IP server is encrypted.

In order to deliver the PII of the first subscriber to the first server, the NE can be configured to collect the PII from one or more relevant servers that reside at the ANOP; to add the PII to the HTTP header and convert it into an enrichment HTTP header and to send an impersonated-enrichment transaction toward the first server. The source address of the impersonated-enrichment transaction can be the assigned IP address (the private IP address) of the first subscriber. The destination IP address and destination port are the same as the inspected transaction that is executed between the first subscribers and the first IP server. Some example embodiments of the novel technique can encrypt the PII that are carried by the impersonated-enrichment transaction. In other example embodiment of the disclosed technique, the NE can be configured to send the PII as a payload of the impersonated transaction instead of the HTTP header.

Some example embodiments of the present disclosure can be implemented by an ISP for handling connections between one or more private IP networks and one or more domains that resides over the Internet. A user may use its assigned IP address as the source IP address and a NAT at the access network, of the ISP, may allocate a temporary public IP address, which replaces the assigned IP address for the relevant connection between the user who is the subscriber of the service provider network and the destination IP server. It should be noted that the term a private IP network can be used for an IP address space that is connected to the public IP network (the Internet) by modifying the private IP address to a public IP address.

For the purposes of simplicity and readability, the present disclosure relates in more details to a mobile access network as an example of an access network, however a person having an ordinary skill in the art can adapt the disclosed technique to other type of access networks.

An example embodiment of the present disclosure can be implemented by a Network Element (NE) that is located in a mobile Access-Network-Operator Premises (ANOP). An example of NE can be communicatively coupled between a plurality of mobile devices (MDs), via an access gateway (AGW), and a plurality of IP servers, via an Internet-Network Gateway (I-GW). An example of an AGW, for an LTE network, can be a packet GW (P-GW). An example of I-GW can be a router. The I-GW can be configured to communicate with a NAT in order to modify an assigned IP address to a public IP address. Along the disclosure the terms CGN and I-GW may be used interchangeably.

Another example embodiment of an NE can be implemented by a TLS proxy that is located at an ANOP of an ISP. The TLS proxy is communicatively coupled between a plurality of subscribers' devices via a public switched telephone network (PSTN) and a plurality of IP servers via an Internet Protocol (IP) network.

During establishing an IP connection between a mobile device and an IP server that is located at an external domain via the ANOP, an embodiment of NE can be configured to obtain the PII of the mobile device. Obtaining the PII can be implemented by using RADIUS protocol between the NE and the AGW, or any other server that resides in the ANOP and stores the PII of the subscribers, for example. RADIUS stands for Remote Authentication Dial-In User Service. Other example embodiments of NE may use protocols such as but not limited to Diameter protocol between NE and a PCRF (Policy and Charging Rules Function) server, etc.

From time to time, an example embodiment of NE can be configured to verify the current value of the allocated public IP address of each of the subscribers that is currently involved in an active transaction. The time interval between each cycle of verification can be referred as verification period (VP). The value of the VP can be few minutes, 15 minutes, 20 minutes, for example. The VP can be used in order to learn the behavior of the relevant CGN. It should be noted that in this disclosure the terms "transaction", "flow" and "connection" can be used interchangeably herein.

An example of NE may use few tables, a subscriber table, an authorized servers table and an active-flow table (AFT), for example. The tables may be embodied on a computer readable device such as a read/write hard disc, CDROM, Flash memory, or other memory devices or data storage devices.

An example of AFT may comprise a plurality of rows; each row can be associated with an active flow. In addition the AFT can comprise a plurality of columns. The first column of AFT can be associated with the allocated public source IP address that was allocated for that session, the second column can be associated with the assigned IP address of the relevant subscriber; the $3^{rd}$ column can be associated with the source port that is used by the MD; the $4^{th}$ and the $5^{th}$ columns can be associated with the destination IP address and port (respectively); the $6^{th}$ column can be associated with the protocol that is used; and the $7^{th}$ and the last column can store the value of the NE time stamp in which the last impersonated packet was sent (LNETS).

An example of a subscriber table can comprise two or more columns and a plurality of rows. Each row can be associated with a mobile device. The first column can be associated with the assigned IP addresses of mobile devices and each one of the other columns can be associated with one type of PII of that mobile devices. Thus, the subscriber table can be used in order to retrieve the PII of a certain subscriber based on the subscriber assigned IP address. The PII may comprise identification information such as but not limited MSISDN, IMSI. In some embodiments the PII may further comprise payment information of the subscriber, purchasing habits, etc. From time to time, every few weeks, two, four, six weeks, etc. the subscriber table can be updated.

An example of authorized server table can comprise two or more columns and a plurality of rows. Each row can be associated with an authorized server. The first column can be associated with the key name of the server (Goggle, for example). The second column can be associated with the IP address of the server, the $3^{rd}$ column can be associated with the Server-Name-Indication (SNI), and the $4^{th}$ column can be associated with the server certificate. Other embodiments may use additional types of server identification parameters. It should be noted that for some authorized servers some of the cells may be empty. In some rows the server certificate may be empty, in other rows the key name can be empty, etc.

Each time a user device, using its assigned IP address, sends a request packet to establish a connection with an IP server that resides in an external domain, an embodiment of NE may search the subscriber table looking of an entry that is associated with the relevant assigned IP address. If an entry was not found then a new line can be added to the subscriber table. The relevant assigned IP address can be written in the cell that is associated with the first column of the new line. Next the NE can apply to the AGW, for example, in order to get the PII of that subscriber. The obtained PII can be stored in the following one or more cells, depending on the number of PII that are used for that subscriber. Then, the user's request to establish the connection can be sent toward the destination IP server via the I-GW and a new line can be added to the AFT. Other example embodiments of the NE may apply to other one or more servers that reside in the ANOP in order to collect the one or more PII of a certain subscriber.

After sending the user request toward the destination IP server, an example embodiment of NE can be configured to check whether the destination IP server is entitle to get the PII of the user. If yes, then some embodiments of the present disclosure may impersonate the mobile device and send an impersonated request toward the relevant IP server carrying the PII as an HTTP header enrichment. The source IP address of the impersonated request will be the same as the original request (the assigned IP address of the mobile device); the source IP port can be different from the original source port and will be used by the NE as a flag for indicting that it is an impersonated request. The destination IP address and port of the impersonated request can be the same as the original request. In parallel the LNETS field, in the flow table, can be update with the value of the NE timestamp in which the impersonated request was sent with the PII. A common CGN may allocate the same source public IP address to the impersonated request as the one that was allocated to the original request.

Some embodiment of NE may be configured to send the PII (in a second packet or in response to a request from authorized server) as encrypted data. In such case the NE and the destination server can be configured to exchange the keys that are needed in order to decrypt the encrypted PII.

The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the disclosed embodiments with the accompanying drawings and appended claims.

BRIEF DESCRIPTION OF THE DRAWING

Exemplary embodiments of the present disclosure will be understood and appreciated more fully from the following detailed description, taken in conjunction with the drawings in which.

DETAILED DESCRIPTION OF EMBODIMENTS OF THE INVENTION

Turning now to the figures in which like numerals represent like elements throughout the several views, in which few examples of embodiments of the present disclosure are described. For convenience, only some elements of the same group may be labeled with numerals. The purpose of the drawings is to describe exemplary embodiments and not for production. Therefore features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware.

In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable device such as a read/write hard disc, CDROM, Flash memory, ROM, or other memory or storage devices, etc. In order to execute a certain task a software program may be loaded to an appropriate processor as needed. In the present disclosure the terms task, method, process can be used interchangeably. In the present disclosure the verbs transmit, transfer or be placed in a queue can be used interchangeably. Packets that are placed in a queue are sent as soon as possible.

Figure 1:
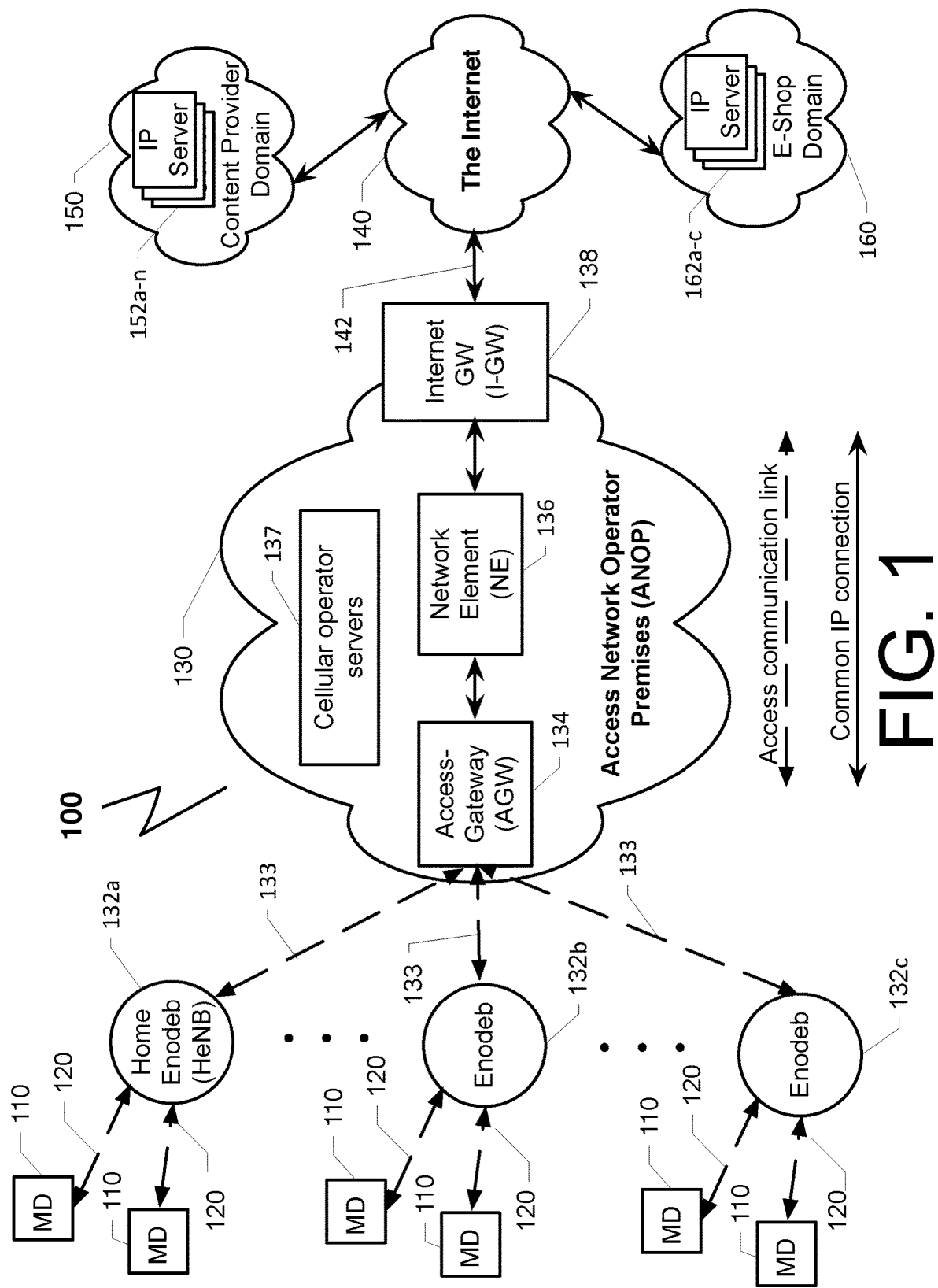
FIG. 1 illustrates a block diagram with relevant elements of an example of a mobile communication system in which an embodiment of the present disclosure can be implemented for handling connections over an IP network.

FIG. 1 depicts a block diagram with relevant elements of an exemplary communication system 100 in which an exemplary embodiment of the present disclosure can be implemented. Communication system 100 can be configured to handle data-packet traffic over TCP/IP network, for example. Communication system 100 can comprise an Access Network Operator Premises (ANOP) 130, a plurality of mobile-devices (MDs) 110, a plurality of intermediate nodes 132a-c, the Internet 140, one or more domains 150 and 160, each one has one or more IP servers 152a-c and 162a-c respectively. Domain 150 can be associated with a content provider, for example. Domain 160 can be associated with an E-Shop, for example. The intermediate nodes 132a-c can comprise: Home Enodeb (HeNB) 132a; and Enodeb 132b&c, for example.

The ANOP 130 can be connected to the Internet 140 via an I-GW 138 and a communication link 142. An example of I-GW 138 can be configured to communicate with a NAT in order to get a public IP address for a new flow. The NAT can be a Carrier-Grade NAT (CGN). The CGN can be one of the operator servers 137. An example of ANOP 130 can be the access network of a GPRS cellular operator, LTE cellular operator, etc.

A few non-limiting examples of typical mobile-devices (MDs) 110 can be: a laptop, a mobile phone, a PDA (personal digital assistance), a smart phone, a tablet computer, one or more type of sensors, connected vehicles, Internet-of-Things (IOT), etc. A smartphone is a mobile phone with an advanced mobile operating system that combines features of a personal computer operating system with other features useful for mobile or handheld use. Each MD 110 may employ a browser application. Following are few not limiting examples of browser applications: Firefox (a trade name of Mozilla), Apple-Safari (a trade name of Apple Inc.), Google-Chrome (a trade name of Google Inc.), etc.

An MD 110 can be connected to an access gateway (AGW) 134 via intermediate nodes such as Enodeb 132b&c or Home enodeb (HeNB) 132a and a backhaul network 133. A non-limiting example of an AGW 134 can be an S-GW or P-GW. Along the disclosure and the claims the term AGW and S-GW can be used interchangeably. The connection between an MD 110 and the intermediate nodes 132a-c can be implemented by cellular links 120.

An ANOP 130 can provide different services to a plurality of MDs 110. Few non-limiting examples of services provided by the ANOP 130 can include: delivering access to the Internet, spam filtering, content filtering, bandwidth consumption, distribution, transcoding, rating adaptation, power saving, etc. Among other elements, an example ANOP 130, which is configured to implement an example embodiment of the disclosed technique, may comprise an example embodiment of a NE 136. An example of NE 136 can be a TCP proxy located between one or more of the MDs 110 via AGW 134 and one or more IP servers via I-GW 138.

Among other tasks, an example of AGW 134 can be configured to identify a requesting MD 110 at its ingress to the ANOP 130, to process the data traffic to or from the plurality of MDs 110 via the one or more intermediate nodes 132a-c. In the direction from the MD 110 toward the internet 140, the AGW 134 can be configured to transfer the IP traffic toward the NE 136. An example AGW 134 can be an S-GW for an LTE network, another example of AGW can be P-GW. The AGW 134 can be configured to identify the subscriber and accordingly can determine whether the subscriber is allowed to get the required access to the network and what services the subscriber is entitled to receive, for example.

In some embodiments of system 100 the AGW 134 can be configured to handle the mobility management of MDs 110 and implement signaling channel over the backhaul network 133 for paging and mapping each MD 110 to its currently associated Enodeb 132a-c. The I-GW 138, at the other side of ANOP 130, may participate in a process of allocating one or more public IP addresses to the requesting MD 110 to be used during the current transaction. In some embodiments I-GW 138 may act also as a router, for example. The I-GW 138 can route IP data packets to and from the plurality of IP servers 152a-c and 162a-c via the Internet 140. The communication between the I-GW 138 and the Internet 140 can be based on Internet protocol (IP). A person with ordinary skill in the art is familiar with the functionality of S-GW, P-GW and I-GW; therefore it will not be further disclosed.

Among other tasks, an example embodiment of NE 136 can be configured to obtain, from one of the cellular operator servers 137, the PII of one or more MDs 110. Obtaining the PII of a certain MD 110 can be implemented while the certain MD 110 establishes an IP connection between the MD 110 and one of the IP servers 152a-c or 162a-c, which are located at an external domain 150 or 160 (respectively) via the ANOP 130.

An example embodiment of NE 136 can be configured to apply to one of the cellular operator servers 137 in order to obtain the PII of a certain MD 110. An example of NE 136 may use Diameter protocol in order to apply to a PCRF (Policy and Charging Rules Function) server 137. Other embodiments of NE can be configured to use RADIUS protocol in order to obtain the PII of a certain MD 110. RADIUS stands for Remote Authentication Dial-In User Service, etc.

An example embodiment of NE 136 can be further configured to impersonate an MD 110, which is currently involved in a communication session with one of the IP servers 152a-c; 162a-c and send an impersonated packet toward the involved server 152a-c; 162a-c, wherein the impersonated packet carries the one or more PII of that MD 110. Further, an example of NE 136 can be configured to deliver the PII of that MD 110 to the relevant server 152a-c, 162a-c, after verifying that the relevant server is authorized to get the PII. More information on the operation of an example of NE 136 is disclosed below in conjunction with FIG. 2 and FIG. 3.

Figure 2:
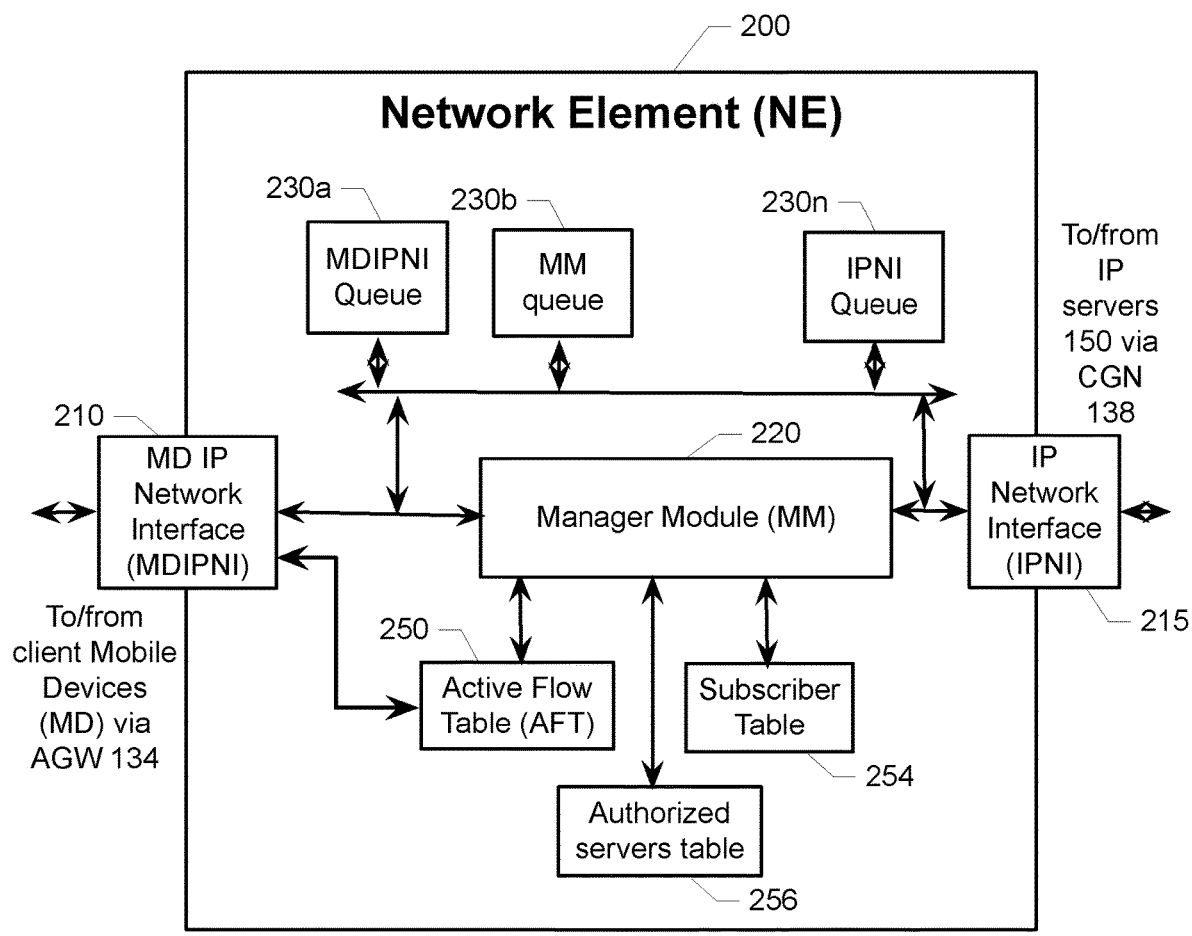
FIG. 2 illustrates a block diagram with relevant elements of an example embodiment of a Network Element (NE), according to the teaching of the present disclosure.

FIG. 2 depicts a block diagram with relevant elements of an example embodiment of an NE 200. An example embodiment of NE 200 may comprise one or more processors, one or more computer readable devices such as but not limited to a read/write hard disc, CDROM, Flash memory, ROM, or other memory or storage devices, etc. Software of a logical module may be embedded on one of the computer readable devices. In order to execute a certain task, a software program may be loaded to an appropriate processor as needed.

An example of an NE 200 can comprise few logical modules such as but not limited to a Manager-Module (MM) 220; an MD IP network interface (MDIPNI) 210; one or more queues, MDQ1 to MDQn 230a-n; and IP network interface (IPNI) 215, for example. In addition NE 200 may comprise few tables, an active flow table (AFT) 250; a subscriber table 254, and an authorized servers table 256. The tables can be stored in one or more memory devices. Each queue 230a-n can be stored in one or more memory devices or all the queues can be stored in the same memory device. In the disclosed embodiment each MDQ 230a-n can be associated with one MD of the plurality of MDs 110 (FIG. 1).

IP packets obtained from MD 110 via the AGW 134 (FIG. 1) can be parsed by the MDIPNI 210. Based on the header of the packet, the MDIPNI 210 can define the flow to which the packet belongs. A flow can be identified by the source and destination IP addresses and ports that are used during establishing that flow. The destination can be one of the IP servers 152a-c, 162a-c (FIG. 1) and the source can be one of the MDs 110.

Other embodiments may use other session detection methods, some embodiments may use the Server Name Indication (SNI) instead of the server IP address and port, other may use the server certificate, etc. Then, the AFT 250 can be searched looking for an entry that is associated with that flow. If an entry does not exist, then the MDIPNI 210 may check whether the packet is a SYN packet. SYN packet is the first packet that is used in TCP-3 way handshake. SYN stand for synchronize packet. The SYN packet is sent by a user in order to establish a TCP/IP connection with a server. Thus the SYN packet indicates a new flow.

If it is a SYN packet, then the MDIPNI 210 can allocate an entry for the new flow in the AFT 250. Next, the relevant fields of that entry can be updated. Fields such as but not limited to destination and source IP addresses and ports number; an indication on one of the MDQ 230a-n that was allocated to that session; domain name. If the packet is not a SYN. then the packet can be thrown away. A person with ordinary skill in the art is familiar with the terms SYN packet and 3 way handshake therefore it will not be further disclosed.

If an entry exists in the AFT then the data in that entry can be parsed and the packet can be transferred toward the relevant MDQ 230a-n. In addition the relevant entry can be updated with the appropriate information. Information such as the obtaining time, which can be referred as the current NE time stamp (CNETS), etc. Then, the packet or a pointer to the packet can be transferred toward the queue of the MM 220 and a trigger can be sent to the MM 220. In an alternate embodiment, if an entry, in AFT 250, does not exist, then the MDIPNI 210 may transfer the packet to the queue of the MM 220 and sent a trigger to the MM 220. In such embodiment the MM 220 can be configured to implement a process which is similar to the process disclosed in the above paragraph in conjunction with MDIPNI 210.

An example of subscriber table 254 can be stored in a memory device. An example of the subscriber table 254 can comprise two or more columns and a plurality of rows. Each row can be associated with a mobile device 110 (FIG. 1). The first column can be associated with assigned IP address of the mobile device 110 and the other column can be associated with each one of the PII of that mobile device. Thus, the subscriber table 254 can be used in order to retrieve the one or more PII of a certain subscriber based on the subscriber assigned IP address. The PII may comprise identification information such as but not limited MSISDN, IMSI. In some embodiments the PII may further comprise payment information of the subscriber, purchasing habits, etc. From time to time, every few weeks, two, four, six weeks, etc. the subscriber table 254 can be updated.

An example of authorized servers table 256 can comprise two or more columns and a plurality of rows. The first column can be associated with the key name of the server (Goggle, for example). The second column can be associated with the IP address of the server, the $3^{rd}$ column can be associated with the Server-Name-Indication (SNI), and the $4^{th}$ column can be associated with the server certificate. Other embodiments may use additional types of server identification parameters. It should be noted that for some authorized servers some of the cells may be empty. In some rows the server certificate may be empty, in other rows the key name can be empty, etc. The following columns may comprise one or more type of PII that the relevant server is entitle to accept.

An example of MDIPNI 210 can comprise one or more processors, state machines, etc. Some embodiments the MDIPNI 210 can be configured to execute one or more tasks that are related to a transaction between a MD 110 and one of the servers 152a-c or 162a-c. The phases can comprise: establishment of the connection that carry the transaction; ongoing phase in which the data is transferred and terminating the transaction. More information on the operation of an example of MDIPNI 210 is disclosed below in conjunction with FIG. 3.

IP packets obtained from IP servers 152a-c, 162a-c via the I-GW 138 (FIG. 1) can be parsed by IPNI 215. Based on the header of the packet, the IPNI 215 can define the flow to which the packet belongs. Then, the AFT 250 can be searched looking for an entry that is associated with that session. Based on the found entry the packet can be transferred toward the relevant queue MDQ 230a-n; and the relevant entry of the AFT 250 can be updated with information such as the address in the relevant MDQ 230a-n in which the packet was stored, the obtaining time, etc. Then, a trigger can be sent to the MM 220. More information on the operation of an example of IPNI 215 is disclosed below in conjunction with FIG. 3.

An example of MM 220 can comprise one or more processors, state machines, registers; internal clock, etc. The clock for the different timers can be one millisecond, for example. An example of MM 220 can be configured to manage the entire operation of the NE 200. During initiation, MM 220 can allocate the computing and the storage (memory volume) resources per each module of NE 200. In some embodiments the MM 220 can be further configured to handle new flows that are not recorded in the AFT 250. In such embodiment, an example of MM 220 can be configured to execute one or more tasks that are disclosed in conjunction with MDIPNI 210. Those tasks nay comprise tasks related to defining the different phases of the flows, tasks relating to obtaining and delivering of the one or more PII of a certain MD 110; etc. More information on the operation of an example of MM 220 is disclosed below in conjunction with FIG. 3.

Figure 3:
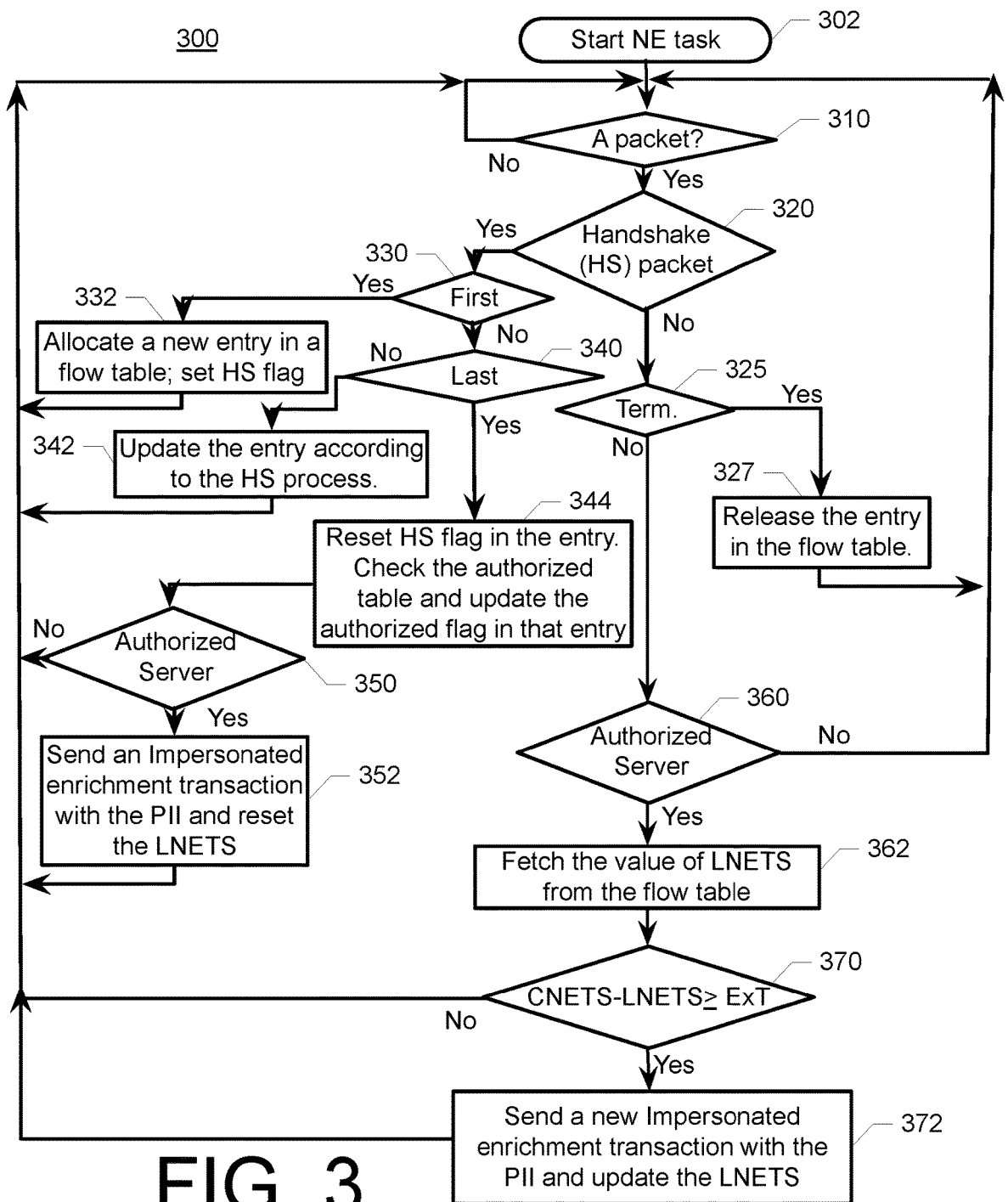
FIG. 3 illustrates a flowchart with relevant actions of an example process that can be handled by an example of an NE.

FIG. 3 illustrates a flowchart with relevant actions of an example process 300 that can be implemented by an example NE 136 (FIG. 1). Process 300 can be implemented for impersonating a subscriber that communicates via a service-provider network with an IP server that resides outside of the service-provider network. As an example of a service-provider network can be a cellular operator access network 130 (FIG. 1) and an example of a subscriber can be an MD 110 (FIG. 1). Some embodiments of the disclosed technique may use the impersonation for identifying and associating an allocated public IP address with the relevant MD 110 to which the public IP address was allocated to. Process 300 can be initiated 302 upon initiating the NE 136 and may be executed as long as NE 136 is active.

Upon initiation 302 resources for handling the disclosed method can be allocated. Resources such as but not limited to storage resources for the relevant queues; tables and programs; timers for defining the NE timestamp, registers for storing the value of CNETS and LNETS, computing resources, networking resources, etc. Then, the authorized-servers table can be loaded with information that is related to the authorized-servers, servers that are entitled to get the PII of a subscriber. Information such as but not limited to URL, SNI, server certificate, etc.

After initiation 302 process 300 may wait 310 for a packet. Upon obtaining 310 a packet or a pointer to a packet that is stored in one of the queues 230a-n (FIG. 2), the packet can be parsed 320 and a decision is made 320 whether the packet belongs to a handshake process. If 320 the packet belongs to the handshake process, then at block 330 a decision is made whether the packet is the first packet of the handshake process. In TCP, for example, the first packet of the handshake process is a SYN packet. If 330 yes, then a new entry is allocated 332 in the AFT 250 (FIG. 2) for the new flow and parameters of new flow can be stored in the allocated entry. Parameters such as but not limited to the source and destination IP addresses and ports, the SNI if exist, etc. The handshake (HS) flag in the allocated entry can be set to true, the obtained packet can be transferred toward it destination and process 300 may return to block 310 for handling the next packet.

If 330 the packet is not the first packet of the handshake process, then a decision is made 340 whether the packet is the last packet of the handshake process. If 340 it is not the last packet of the HS process, then 342 the relevant entry in AFT 250 can be updated according to the current phase of the HS process; the obtained packet can be transferred toward it destination and process 300 may return to block 310 for handling the next packet.

If 340 the packet is the last packet of the handshake process, then the HS flag in the relevant entry of AFT 250 can be reset 344 and the authorized-servers table 256 (FIG. 2) can be checked in order to determine whether 350 the relevant destination 152*a-c* or 162*a-c* (FIG. 1) is authorized to get the PII of the involved MD 110. The last packet of the handshake process of HTTP can carry an ACK message from the relevant MD toward the relevant server. The last packet of the handshake process of HTTPS can carry "Server Finished" message from the relevant server 152*a-c* or 162*a-c* toward the relevant MD 110.

If 350 the relevant destination server 152*a-c* or 162*a-c* (FIG. 1) is not authorized to get the PII of the involved MD 110, then the obtained packet can be transferred toward it destination, and process 300 may return to block 310 for handling the next packet. If 350 the relevant destination server 152*a-c* or 162*a-c* (FIG. 1) is authorized to get the PII of the involved MD 110, then the subscriber table 254 (FIG. 2) can be search looking for an entry that is associated with the relevant MD 110.

The relevant entry can be parsed and the one or more PII data can be retrieved. Then, 352 an impersonated-enrichment transaction carrying the one or more retrieved PII can be sent toward the relevant server 152*a-c* or 162*a-c* and the current value of the NE 136 (FIG. 1) timestamp (NETS) can be stored as the LNETS field in the relevant entry of AFT 250. In addition, an indication that the destination server 152*a-c* or 162*a-c* is authorized to get the PII can be written in the appropriate field of the entry in AFT 250 that is associated with the current flow.

The source IP address of the impersonated-enrichment transaction can be the assigned IP address of the relevant MD 110; the source port can be a unique port number, such as 400 for example. The destination IP address and port of the impersonated-enrichment transaction can be the same as the address and port that are associated with the obtained packet. Then, the obtained packet with the enrichment header that carries the PII can be transferred 352 toward it destination and process 300 may return to block 310 for handling the next packet. Some embodiments of the disclosed technique may add the PII to one or more impersonated packets that can be sent close to sending 352 the obtained packet. Then, process 300 may return to block 310 for handling the next packet.

Returning now to block 320, if the packet does not carry an HS message then at block 325 a decision is made whether the packet carries a termination message that terminates the current flow. In TCP, for example, the termination message of a flow can be a FIN packet. If 325 yes, then based on the MD 110 (FIG. 1) IP address and port and the server 152*a-c* or 162*a-c* IP address and port, or the SNI value, or any other indication of the relevant server, the AFT 250 (FIG. 2) can be searched for an entry that is associate with the current flow. The found entry in AFT 250 (FIG. 2) can be released 327, the obtained packet can be transferred toward its destination and process 300 may return to block 310 for handling the next packet.

If 325 the packet does not carry a termination message, then based on one of the servers identifications (URL, SNI, server certificate, etc.) the Authorized-severs table 256 (FIG. 2) can be searched looking to a relevant entry in order to determine whether 360 the server 152*a-c* or 162*a-c* is authorized to get the one or more PII of the MD 110 (FIG. 1). If 360 the server is not authorized, then the obtained packet can be transferred toward its destination and process 300 may return to block 310 for handling the next packet.

If 360 the server is authorized to get the PII, based on the source and destination IP addresses and ports the AFT 250 (FIG. 2) can be searched 362 for an entry that is associated with this flow. The found entry can be parsed and the value of the LNETS can be retrieved. Next a decision is made 370 whether the time interval, between the current NE time stamp (CNETS) and the time stamp in which the last impersonated transaction (LNETS) was sent, exceeds the value of the expiration time (ExT). An example of ExT can represent the maximum silent period, in which the first subscriber has been not active. The value of ExT can be a configurable value in the range of few minutes, 15 minutes, 20 minutes, etc. If 370 the time interval is smaller than ExT, then process 300 transfers the packet toward it destination and retunes to block 310 for handling the next packet.

If 370 the time interval exceeds the value ExT, then an example of NE 136 can impersonate the relevant MD and send 372 an "impersonated enrichment transaction" toward the destination server 152*a-c* or 162*a-c* (FIG. 1) via the I-GW 138. The "impersonated enrichment transaction" can carry the one or more PII of the relevant MD. The source IP address of the "impersonated enrichment transaction" can be the assigned IP address of that MD 110 (FIG. 1), the source port can be a different port number than the one that is used in the original transaction. The different port number can be a unique port number, port 400 for example, that can be used as a flag to identify the "impersonated enrichment transaction". The destination IP address and port number of the "impersonated enrichment transaction" can be the same as the one that are used in the original transaction. Then, the value of the LNETS can be updated, process 300 may transfer the obtained packet toward it destination and retunes to block 310 for handling the next packet.

The present disclosure discloses few methods that can be implemented by a novel network element that resides in an access network operator premises (ANOP). The novel network element is communicatively coupled between a plurality of subscribers that are connected to the service provider network of the operator and the Internet. The disclosed methods can be used for delivering the PII of the subscribers, who use assigned IP addresses, to authorized IP servers that reside in the Internet.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method comprising:
   (a) employing, a network element (NE) that is communicatively coupled between a plurality of subscribers and a plurality of IP servers;
   (b) configuring the NE to inspect transactions that are executed between the plurality subscribers and the plurality of IP servers, and to deliver, over an impersonated packet, Personally Identifiable Information (PII) of a first subscriber from the plurality of subscribers toward a first server from the plurality of IP servers wherein the first server is involved in at least one transaction with the first subscriber;
   wherein the first server, is authorized to obtain the PII of the first subscriber; and
   wherein the impersonated packet comprises a source IP address of the first subscriber and a destination IP address of the first server.

2. The method of claim 1, wherein the plurality of subscribers communicate over a cellular network.

3. The method of claim 2, wherein the first subscriber is a mobile device (MD).

4. The method of claim 3, wherein the MD is a smart phone.

5. The method of claim 3, wherein the NE communicate with the plurality of IP servers by using a Network-Address Translator (NAT), wherein the NAT is configured to allocate to the first subscriber a public IP address.

6. The method of claim 5, wherein the NAT is a Carrier-grade NAT (CGN).

7. The method of claim 3, wherein the PII comprises a MSISDN of the first subscriber.

8. The method of claim 3, wherein the PII comprises a IMSI of first subscriber.

9. The method of claim 1, wherein the communication between the first subscriber and the first IP server is encrypted.

10. The method of claim 6, wherein the CGN is configured to change the allocated public IP address that was allocated to the first subscriber after a silent period in which the first subscriber has been not active.

11. The method of claim 1, wherein the impersonated packet comprises an impersonated-enrichment transaction.

12. The method of claim 1, wherein the NE is configured to encrypt the PII of the first subscriber before delivering the PII to the first server.

13. The method of claim 1, wherein the source IP address of the first subscriber is the private IP address of the first subscriber.

14. A computer readable device comprising executable instructions that when executed cause a processor, at a network element (NE) to:
   inspect transactions that are executed between a plurality subscribers and a plurality of IP servers, and
   deliver, over an impersonated packet, Personally Identifiable Information (PII) of a first subscriber from the plurality of subscribers toward a first server from the plurality of IP servers that is involved in at least one transaction with the first subscriber;
   wherein the NE is communicatively coupled between a plurality of subscribers and a plurality of IP servers;
   wherein the first server, is authorized to obtain the PII of the first subscriber; and
   wherein the impersonated packet comprises a source IP address of the first subscriber and a destination IP address of the first server.

15. The computer readable device of claim 14, wherein the communication between the first subscriber and the first IP server is encrypted.

16. The computer readable device of claim 14, wherein the source IP address of the first subscriber is the private IP address of the first subscriber.

17. A network element (NE) that is communicatively coupled between a plurality of mobile devices (MDs) via a cellular network and a plurality of IP servers via an Internet Protocol (IP) network, the NE comprising:
   a. a manager logical module (MM);
   b. an active flow table (AFT), which is stored in a memory device;
   c. one or more queues, embedded in one or more memory devices;
   d. an IP network interface logical module (IPNI);
   e. an MD IP network interface (MDIPNI); and
   wherein the MM is configured to deliver, over an impersonated packet, Personally Identifiable Information (PII) of a first MD from the plurality of MDs to a first server from the plurality of IP servers that is involved in at least one transaction with the first MD; and
   wherein the impersonated packet comprises a source IP address of the first subscriber and a destination IP address of the first server.

18. The NE of claim 17, wherein the at least one transaction is encrypted.

19. The NE of claim 17, wherein the source IP address of the first subscriber is the private IP address of the first subscriber.

20. A method comprising:
   a. employing, a network element (NE) that is communicatively coupled between a plurality subscribers and a plurality of IP servers via an Internet Protocol (IP) network, wherein the plurality subscribers are connected via a cellular network and each subscriber has an assigned IP address, wherein a Network Address Translator (NAT) is used to allocate a public IP address;
   b. configuring the NE to:
      i. inspect transactions that are executed between the plurality subscribers and the plurality of IP servers;
      ii. identify a new transaction that is executed between a first subscriber from the plurality of subscribers toward a first server from the plurality of IP servers;
      iii. verify that the first IP server is authorized to obtain the Personally Identifiable Information (PII) of the first subscriber; and
      iv. if the first IP server is authorized then deliver, over an impersonated packet, one or more Personally Identifiable Information (PII) of the first subscriber to the first server; and if the first server is not authorized then do not deliver the PII
   c. wherein the impersonated packet comprises a source IP address as the assigned IP address of the first subscriber and a destination IP address of the first server.

21. The method of claim 20, wherein the transaction is encrypted.

* * * * *